(No Model.)
J. C. W. BOICE.
SEDIMENT GATHERER FOR COFFEE POTS, &c.
No. 481,547. Patented Aug. 30, 1892.
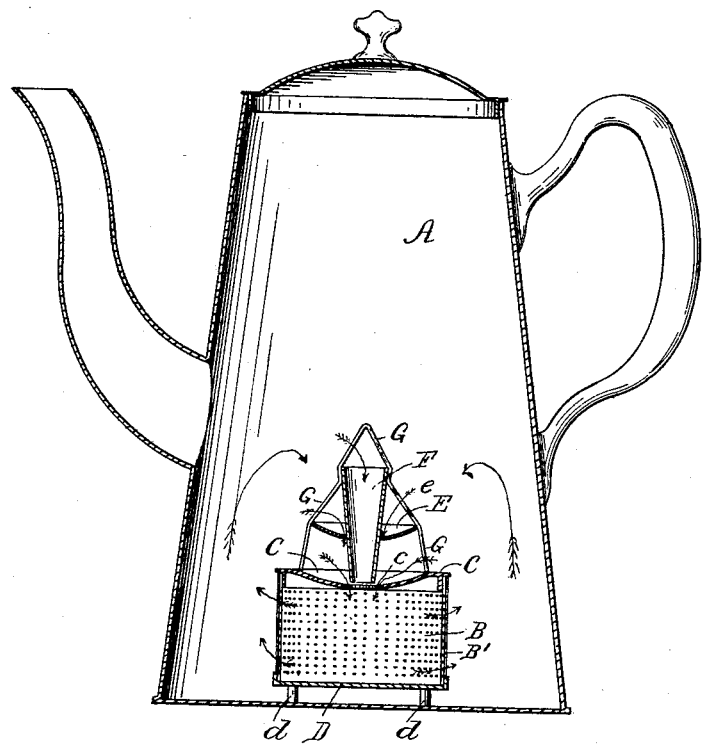
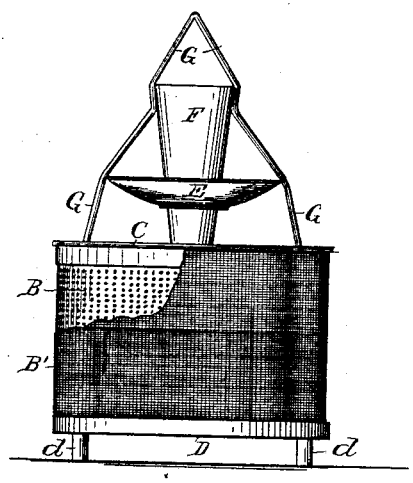
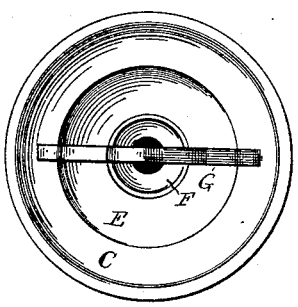
Witnesses
R. A. Balderson
Bessie E. Young
Joseph C. W. Boice, Inventor
By James G. Young
His Attorney

UNITED STATES PATENT OFFICE.

JOSEPH C. W. BOICE, OF BATES CITY, MISSOURI, ASSIGNOR OF ONE-THIRD TO WILLIAM W. BAILEY, OF SAME PLACE.

SEDIMENT-GATHERER FOR COFFEE-POTS, &c.

SPECIFICATION forming part of Letters Patent No. 481,547, dated August 30, 1892.

Application filed June 27, 1891. Serial No. 397,748. (No model.)

*To all whom it may concern:*

Be it known that I, JOSEPH C. W. BOICE, a citizen of the United States, residing at Bates City, in the county of Lafayette and State of Missouri, have invented certain new and useful Improvements in Sediment-Collectors; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a sediment-collector readily adapted for use in all liquid bodies where there is an application of heat and a demand for the collecting into one body of all sediment contained in the liquid.

I am aware that there are various devices specially intended for the removal of sediment from coffee and other liquids; but I am not aware that any device has been produced that will by reason of its peculiar construction create a current of liquid substantially rising from the bottom of the vessel in which the collector is placed toward the top of the liquid as soon as heat is applied, thence seeking a downward course into the center of the collector, resulting in the collection and retention of all sediment by virtue of the peculiar construction of the collector and holding the sediment therein, aided by the pressure of the downward current of the liquid, as is the case with my invention. I attain these results by the mechanism illustrated in the accompanying drawings, in which—

Figure I is a sectional view of an ordinary coffee or tea pot, showing therein a sectional view of my sediment-collector. Fig. II is a perspective view of my sediment-collector with a portion of the surrounding fabric for retaining the sediment cut away, exposing the metallic perforated cylinder wall. Fig. III is a detailed plan view of the cover, supplemental cover, funnel, and brace or handle.

Similar letters refer to similar parts throughout the several views.

A represents the coffee-pot; B, the perforated cylinder-wall of the collector; B', the fabric covering of perforated cylinder-wall; C, the concave cover; c, central opening; D, base of perforated cylinder; d d, supports under same; E, concave supplemental cover secured by braces G G; e, central opening in same; F, the draft-funnel or spout; G G, the handle or brace uniting and supporting the concave cover C, the concave supplemental cover E, and the draft-funnel or spout F.

In the operation of my invention the sediment-collector is placed in the coffee-pot, which by means of its legs removes the bottom of the collector a short space from the bottom of the coffee-pot or vessel containing the liquid to be purified. The bottom and sides of the vessel being in direct contact with the heat, as the liquid is heated it ascends toward the top and the cold liquid descends toward the bottom of the collector. The collector prevents, so far as the space it occupies is concerned, a direct ascent toward the top. Hence it divides the heated portion from a direct upward line toward the center, and having ascended to the top, near the outside, it then seeks an equilibrium of heat with surrounding liquid and tends toward the center, where there is no direct upward current of heated liquid. The same law prevails in the downward tendency of the cold liquid seeking the hottest part or place in the vessel, and in its downward course, with the aid of the concave open cover, supplemental cover, and funnel there is a current established which carries the sediment toward the center and bottom. The sediment thus collected is held concentrated toward one point, (the bottom of the collector,) and the cold particles of liquid seeking the bottom of the vessel pass out through the perforated cylinder and straining fabric, always seeking the downward course, which fact tends to hold all the sediment in the collector, and may thus be removed at will.

Having fully described my invention, what I claim, and desire to secure by Letters Patent, is—

In combination with a perforated and cloth-covered cylinder, the concave open cover C, the supplemental concave cover E, funnel F, and the handle G G G, substantially as set forth.

JOSEPH C. W. BOICE.

Witnesses:
W. W. BAILEY,
E. L. ANDRIST.